Sept. 2, 1924. 1,507,548
J. S. BAKER
BALLOT COUNTING MACHINE
Filed Nov. 10, 1920   11 Sheets-Sheet 5

Inventor
John S. Baker
By Alexander & Dowell Attorney

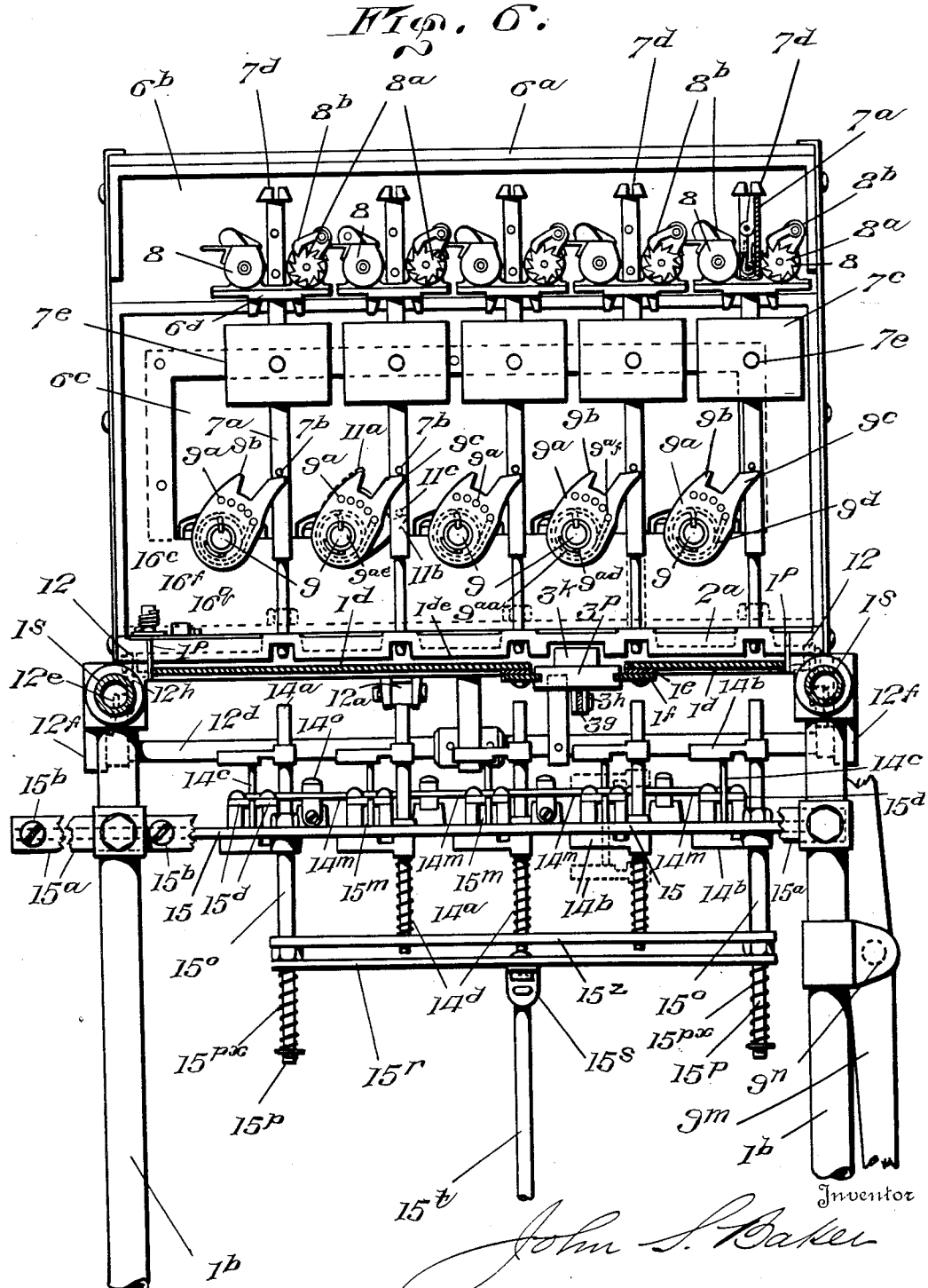

Sept. 2, 1924.

J. S. BAKER

BALLOT COUNTING MACHINE

Filed Nov. 10, 1920     11 Sheets-Sheet 7

Inventor
John S. Baker
By Alexander Powell
Attorneys

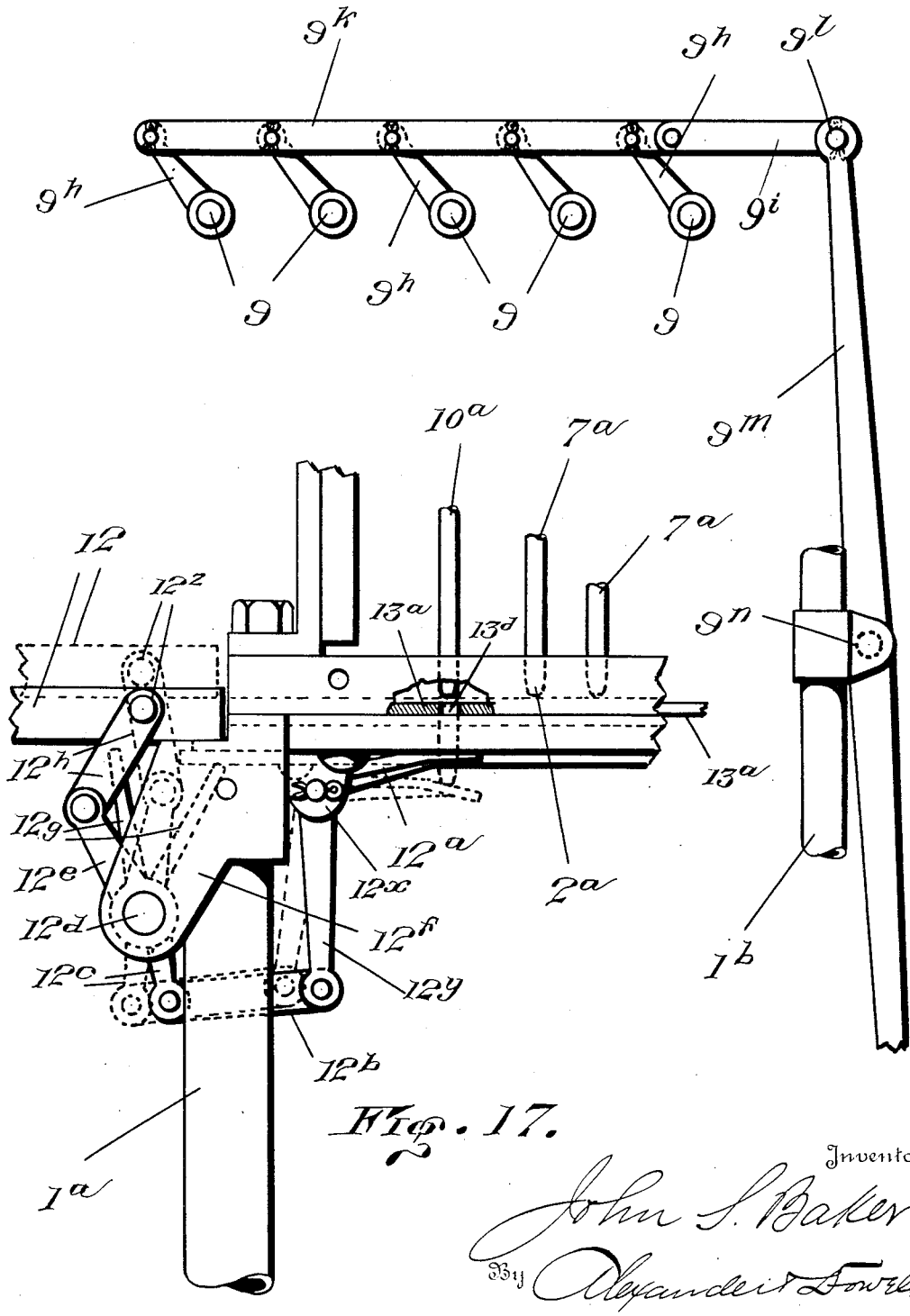

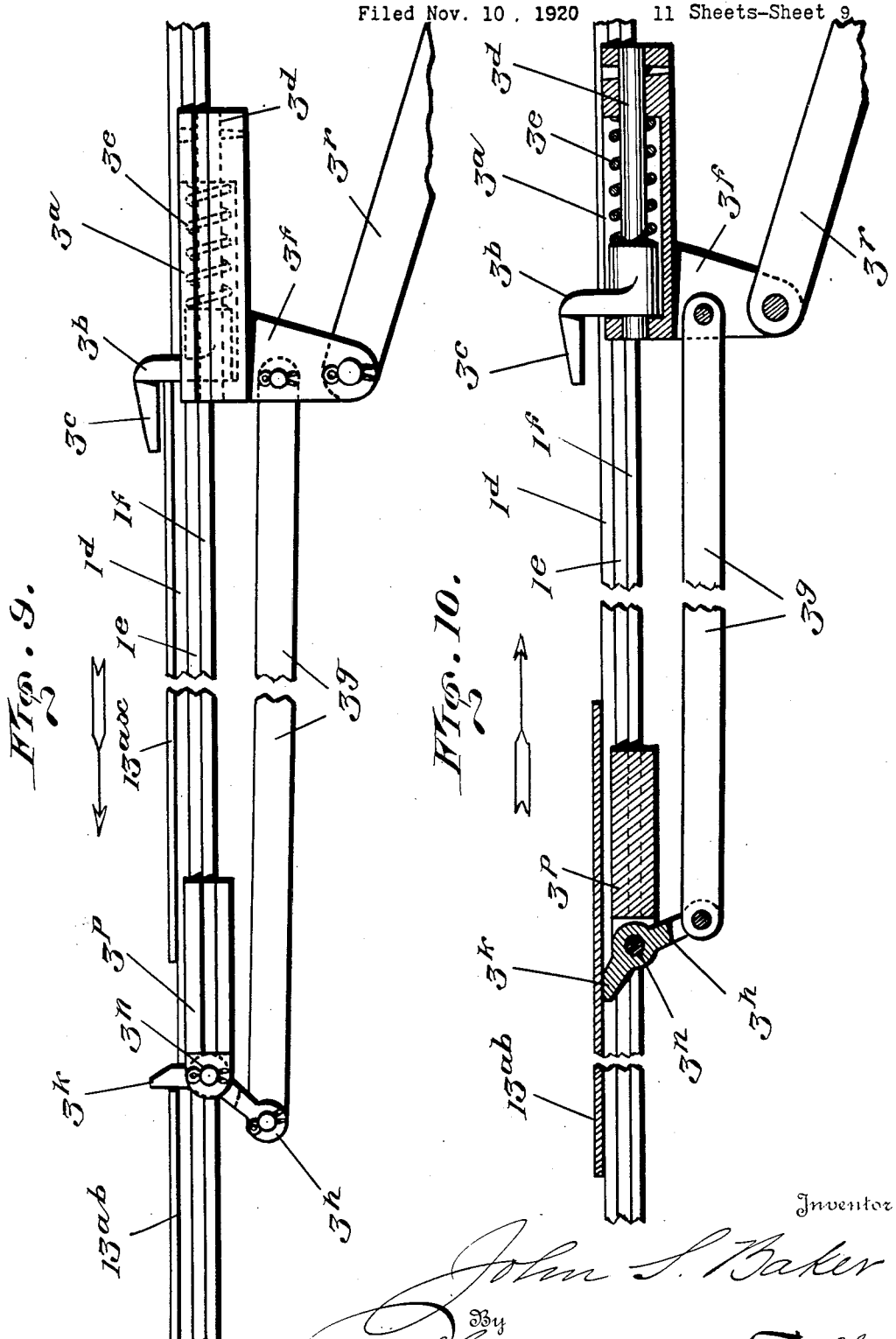

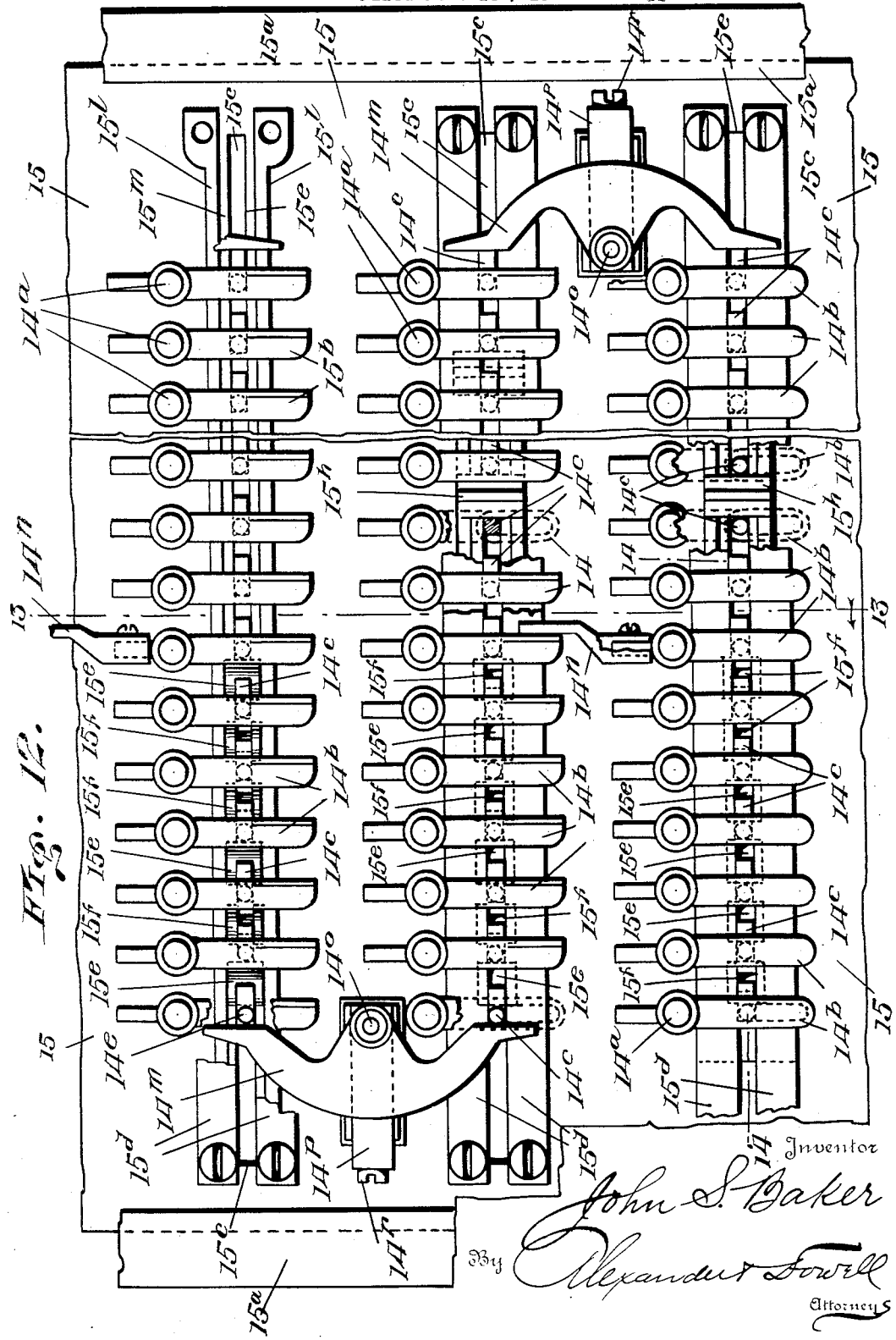

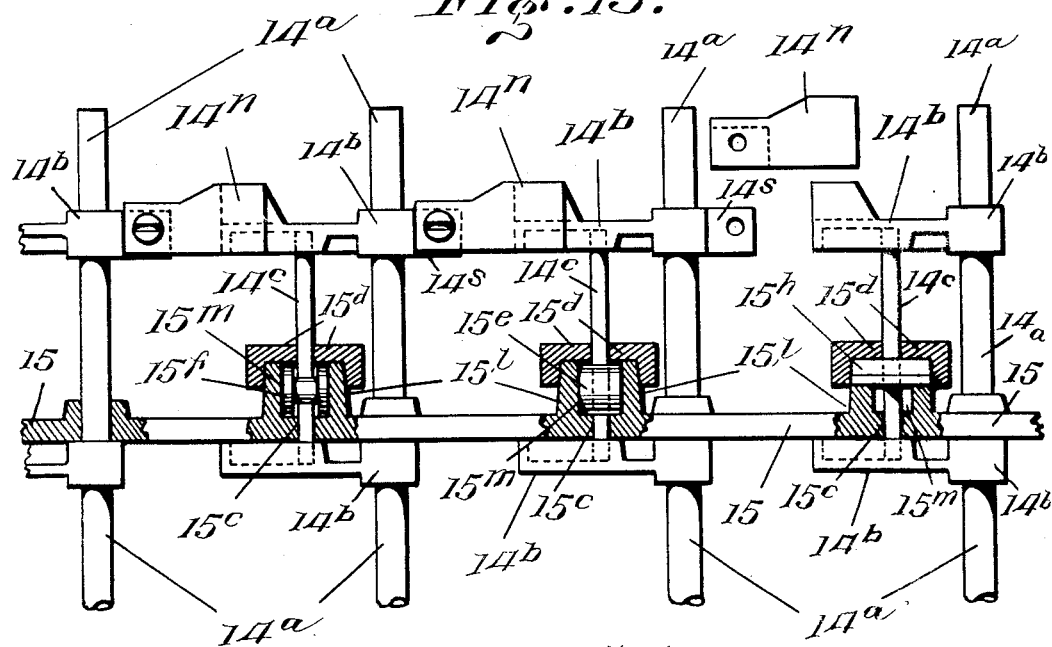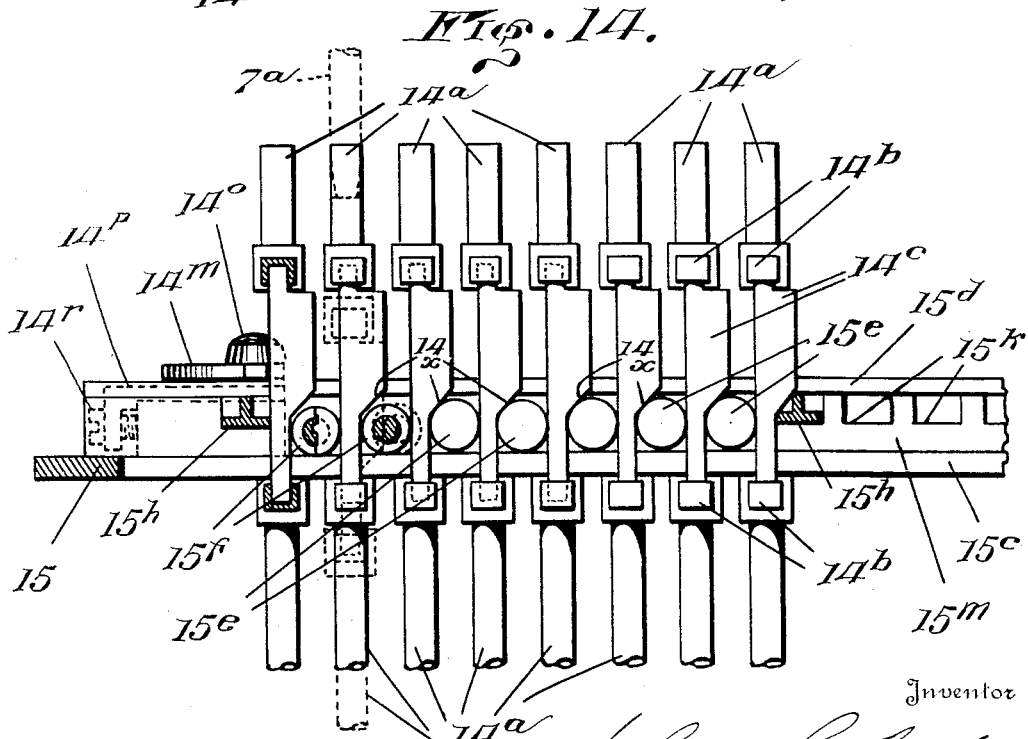

Patented Sept. 2, 1924.

1,507,548

UNITED STATES PATENT OFFICE.

JOHN S. BAKER, OF LOS ANGELES, CALIFORNIA.

BALLOT-COUNTING MACHINE.

Application filed November 10, 1920. Serial No. 423,117.

*To all whom it may concern:*

Be it known that I, JOHN S. BAKER, a citizen of the United States, residing at Los Angeles, in the county of Los Angeles and State of California, have invented certain new and useful Improvements in Ballot-Counting Machines; and I hereby declare that the following is a full, clear, and exact description thereof, reference being had to the accompanying drawings, which form part of this specification.

This invention is a novel machine for registering and counting various items designated on properly prepared cards, such as ballots, which cards are prepared separately from the machine and then passed therethrough, the different items to be registered being punched on the cards before they are placed in the machines, and only these items punched on the cards being registered.

The machine is particularly designed for registering and counting ballots of the type shown and described in my Letters Patent No. 1,350,914, dated August 24, 1920, used in voting for State and U. S. Government officials in general elections. The principal objects are to expedite the counting of such ballots, after the polls close, by mechanical means, eliminating hand counting and giving absolute accuracy, without changing the present system of voting. The specific objects of the present invention are to provide a machine wherein such patented ballots can be placed and automatically fed through the machine and votes for individual candidates registered; and wherein if the voter votes a special ballot by writing on the ballot the name of a person instead of voting for a candidate whose name is printed on the ballot, such special ballot will be thrown out so that it can be separately counted; also to provide means whereby if a voter attempts to vote for more than the proper number of candidates in any group or for any office the registration of such part of the ballot will be prevented.

The invention includes novel means for feeding the ballots to detecting and registering devices; novel means for individually registering the votes cast for each candidate; novel means for preventing the operating of the counting mechanism if the ballot is a special ballot; and novel means for preventing the registration of an improper number of votes for any office on any one ballot. Other novel features and means will be hereinafter pointed out.

I will explain the invention with reference to the accompanying drawings which illustrate so much of a ballot feeding registering and counting mechanism capable of accomplishing the aforesaid objects, as will enable others to construct and use the invention; I refer to the claims for summaries of the essential features of the invention and of the novel constructions and novel combinations of parts, for all of which protection is desired.

Figure 2:
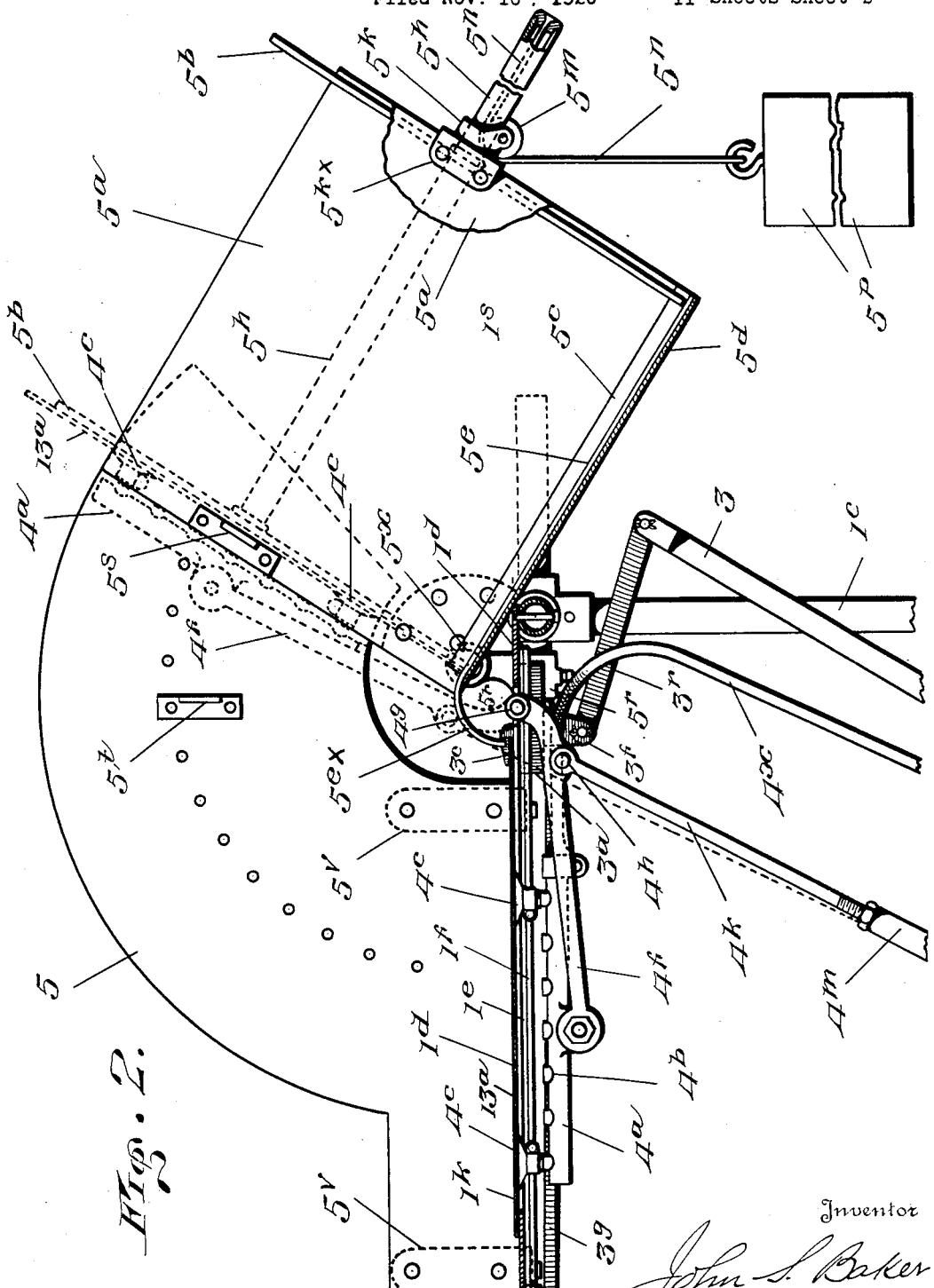
Fig. 2 is a side elevation partly in section of the upper right hand end of the machine containing the mechanism for delivering the ballots to be registered to the mechanism shown in Fig. 1. This figure should be placed beside and read as a continuation of Fig. 1.
Figure 3:
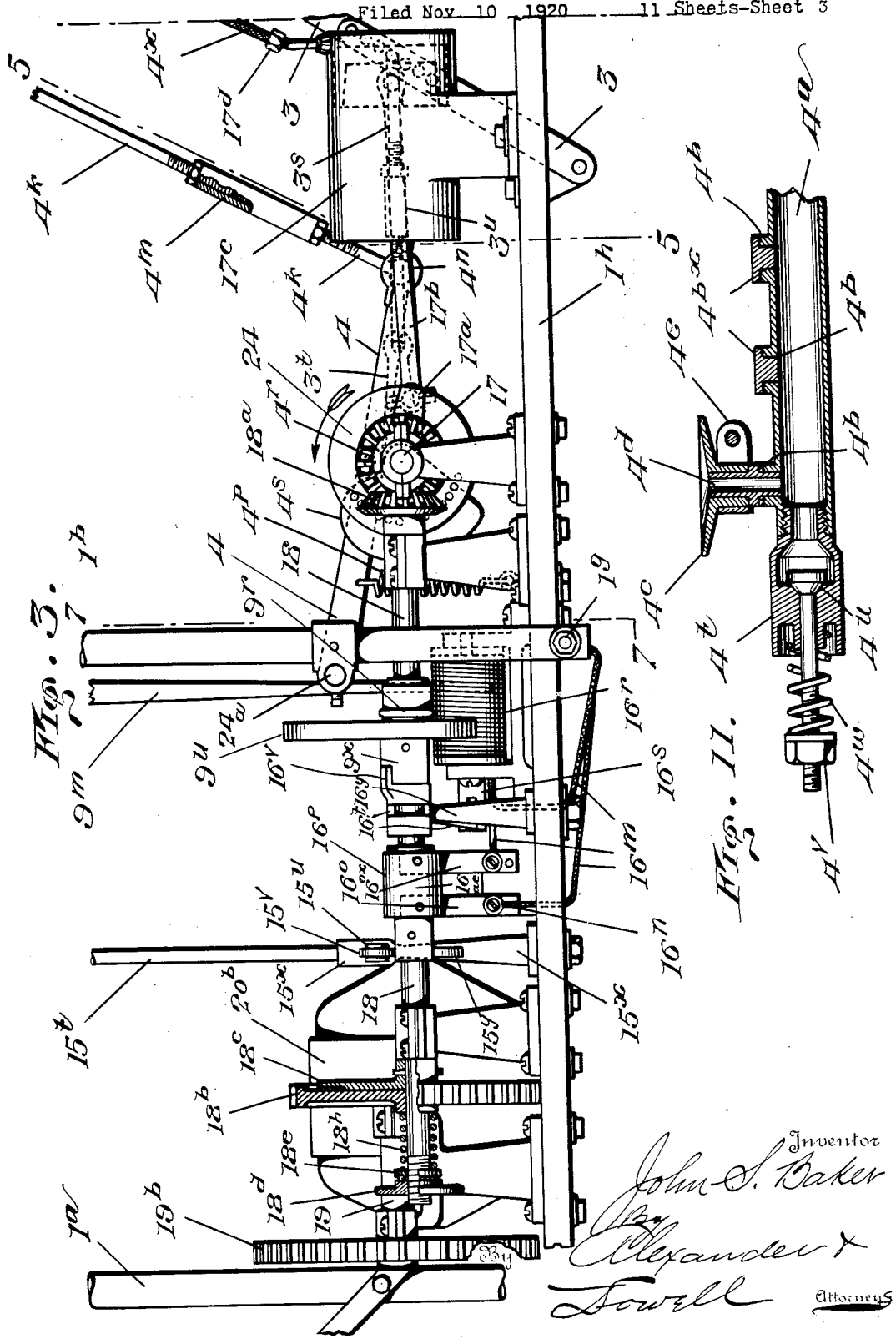

Fig. 3 is a view of the lower part of the machine partly in section, showing the driving mechanism. Fig. 3 should be placed beneath and read in connection with Figs. 1 and 2, the three figures 1, 2 and 3 together forming substantially a complete side elevation of the entire machine.

Figure 4:
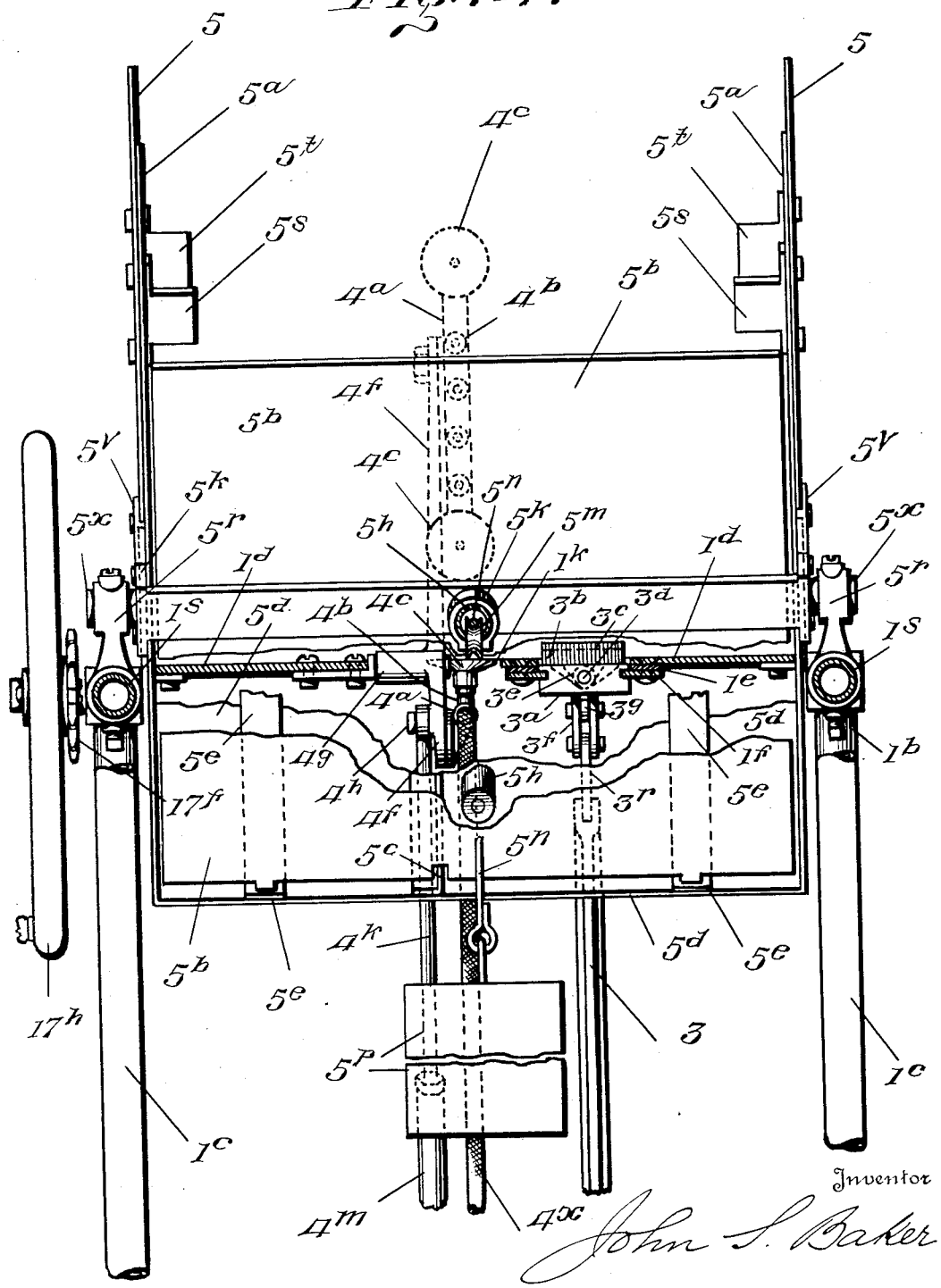

Fig. 4 is an end view of Fig. 2 partly in section and partly broken away.

Figure 5:
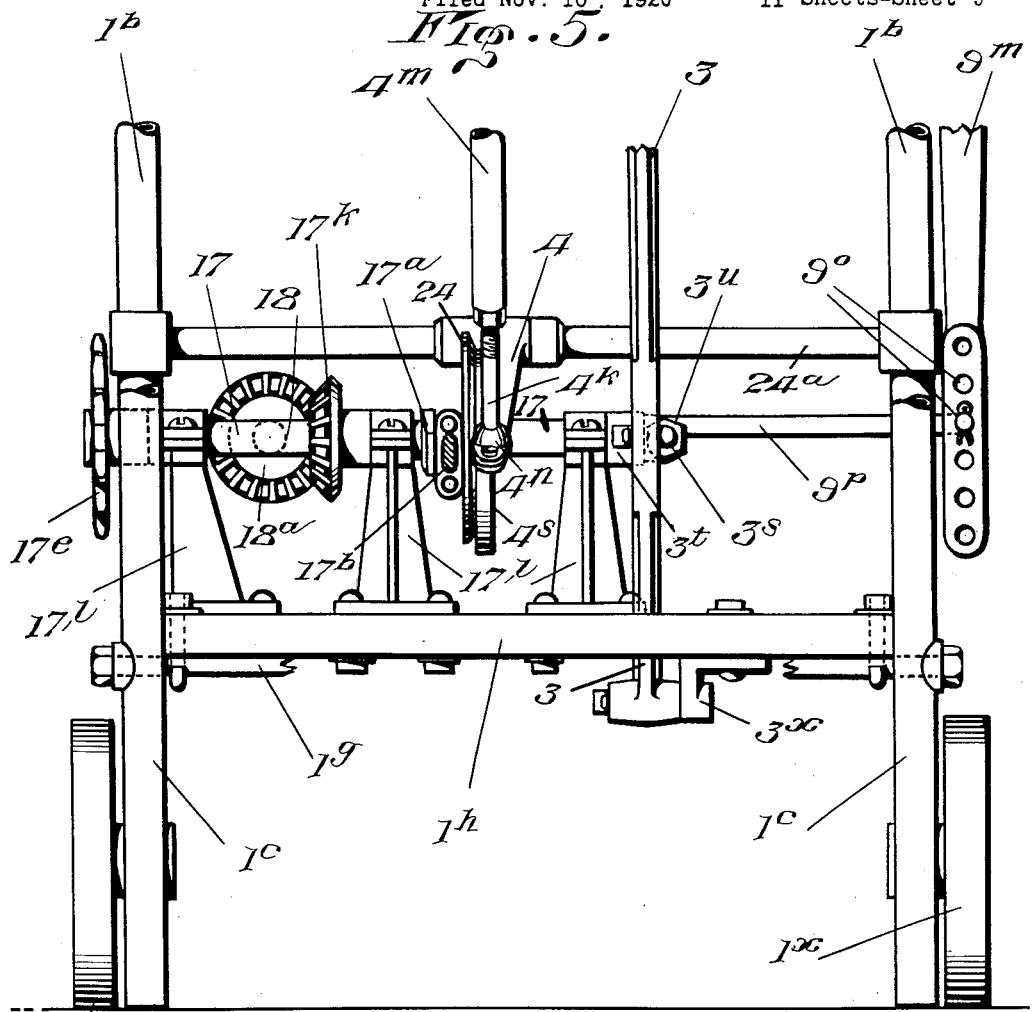

Fig. 5 is a sectional view partly broken away on lines 5—5, Fig. 3 with pump removed.

Figure 1:
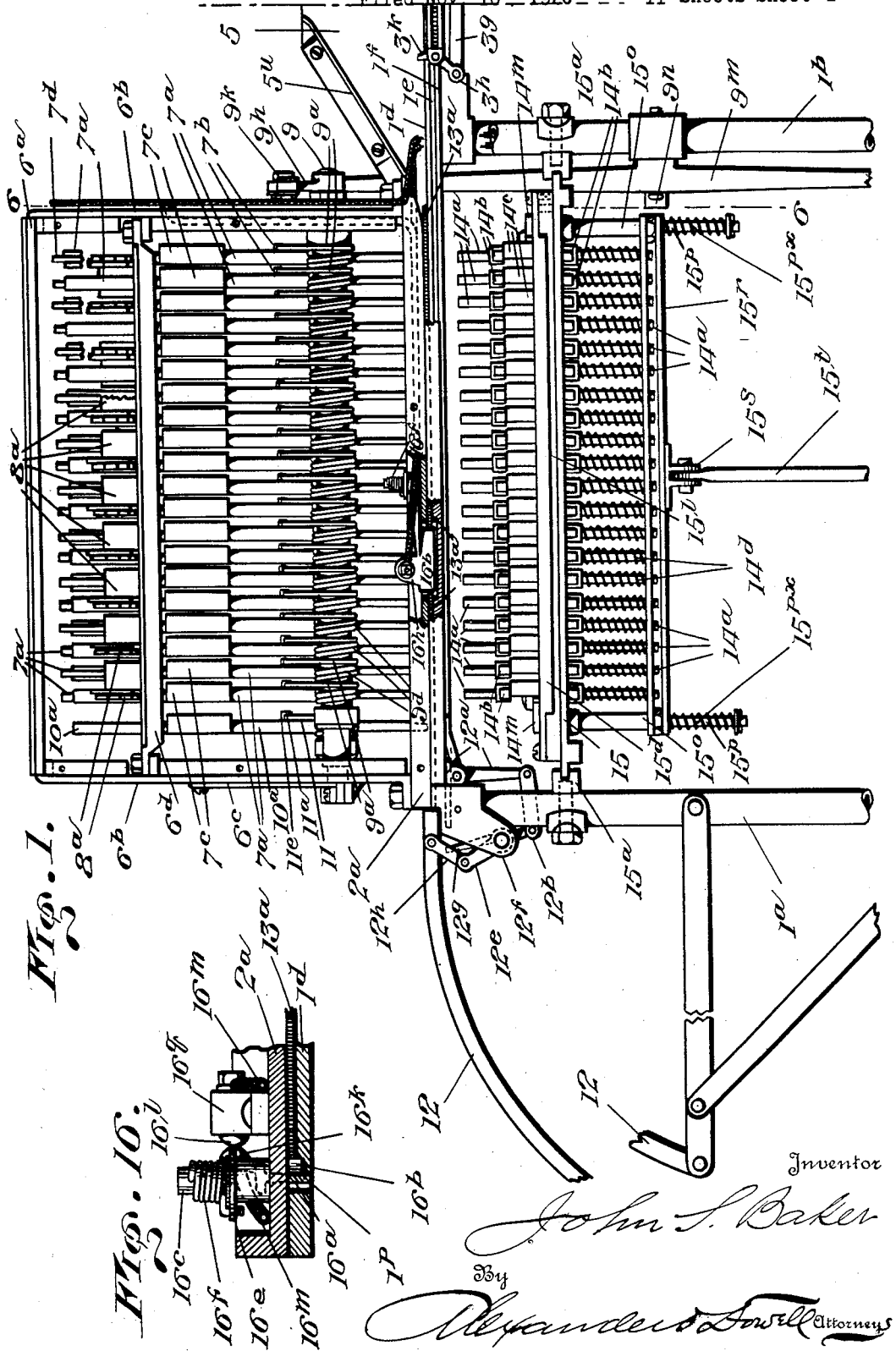
Fig. 1 is a side elevation of the upper left hand portion of the machine with the casing removed to show the operating parts.

Fig. 6 is a sectional end elevation of Fig. 1 on line 6—6, Fig. 1, with the right hand end bearing frame 6$^b$ plate removed and the delivery table and some minor parts shown in section.

Figure 7:
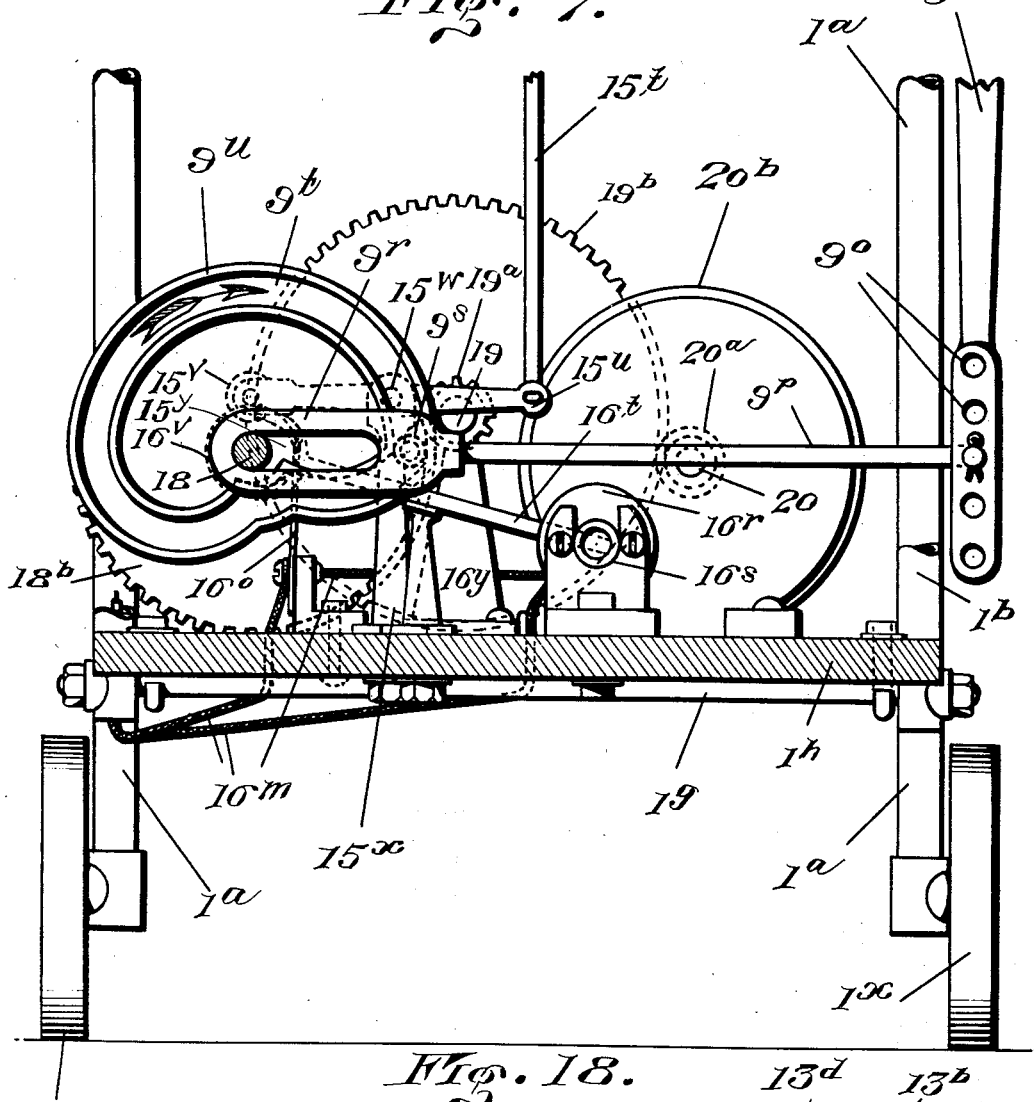

Fig. 7 is a section on line 7—7, Fig. 3.

Fig. 8 is a detail of the detector pin operating mechanism.

Fig. 9 is a detail view of the ballot delivery feed and devices indicating them advancing to the left.

Fig. 10 is a detail view like Fig. 9 partly in section, indicating the parts moving to the right.

Fig. 11 is an enlarged detail sectional view of the ballot picker.

Fig. 12 is an enlarged plan view of the interlocking devices which prevent the counting of improperly voted ballots.

Fig. 13 is an additional sectional view practically on line 13—13, Fig. 12.

Fig. 14 is a detail section on the line 14—14 Fig. 12.

Figure 15:
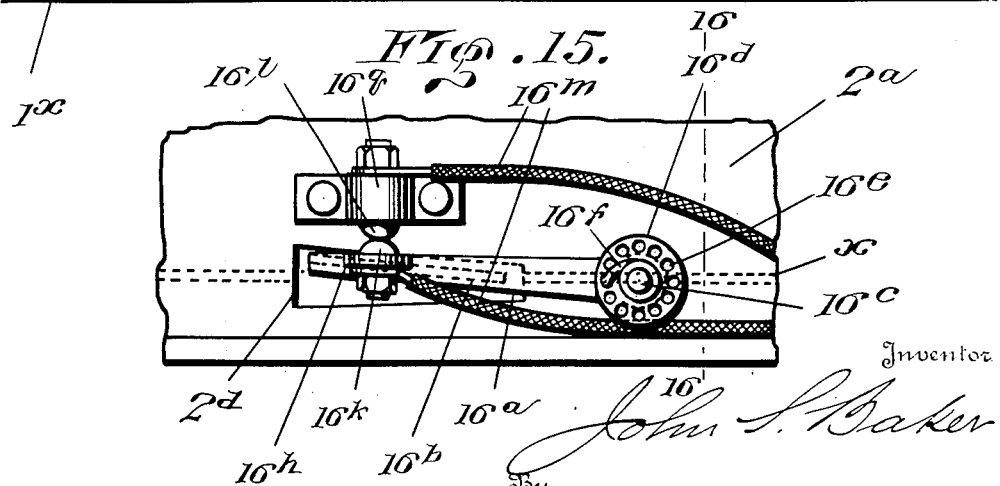

Fig. 15 is an enlarged detail view of the ballot side adjusting shoe and circuit breaker.

Fig. 16 is a sectional view on line 16—16, Fig. 15.

Fig. 17 is an enlarged detail view of the ballot shunting devices.

Figure 18:
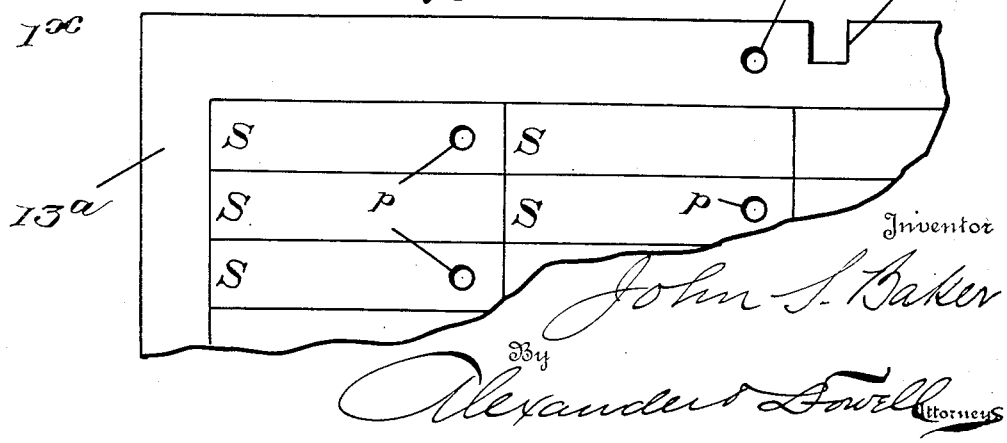

Fig. 18 is a detail view of part of a ballot.

The various operative mechanisms of the machine may be mounted upon or in any suitable frame or case. Preferably I make the supporting frame of metal tubing for the purpose of lightness, and enclose the registering mechanisms in a suitable housing mounted on such frame so that they cannot be tampered with during the registering of the ballots by the mechanism, which after being voted are automatically fed one by one from a feed box to the registering mechanism and then discharged therefrom.

*The ballot feed box.*

In the particular embodiment of the invention shown in the drawings the voted ballots are placed in a hopper or feed box (Figs. 2-4) having a bottom plate $5^d$ and sides $5^a$ connected by a rear bar $5^k$. Within this feed box operates a follower or feed plate $5^b$ which is shown as connected to a slotted rod $5^h$ that extends through a guide $5^k$ attached to the bar $5^{kx}$, and a weight $5^p$ is connected by a cord $5^n$ to the outer end of the rod $5^h$ and runs over a pulley $5^m$ attached to the guide $5^k$, so that the weight causes the follower $5^b$ to move the ballots along in the box towards the discharge end thereof until the innermost ballot is arrested by stops $5^s$ attached to the sides of the box.

In the bottom of the feed box are guides $5^e$, the forward ends $5^{ex}$ of which project beyond the inner end of the box and are curved downwardly toward the top surface of the feed table $1^d$ on which the ballots $13^a$ taken from the box are successively laid; and after which they are moved into the registering mechanism by means hereinafter described.

Guard plates 5 are connected with the sides $5^a$ of the box and extend besides the table from the box to the casing of the registering mechanism and direct the ballots thereto. The feed box may be mounted upon trunnions $5^x$ engaging $5^r$ attached to the top members $1^s$ of the framing of the machine. The box can be tilted to any desired position on the trunnions and is held in adjusted position by means of the bolts that fasten the rests $5^s$: which bolts pass through the box sides $5^a$ and through the guide plates 5. Guides 5 are attached to the table $1^d$ by tongues $5^v$ and prevent the ballots from working sidewise on the table $1^d$.

*The pneumatic ballot feeder.*

The ballots are preferably taken one at a time from the feed box and laid onto the feed table $1^d$ by means of suction devices; which as shown in Figs. 2, 4 and 11 consists of an oscillating sheet picker comprising a tube $4^a$ (shown enlarged in Fig. 11) having a plurality of openings $4^b$, with some of which are connected screw nipples $4^d$, to which may be attached rubber suction cups $4^c$, that may be secured to the nipples by split clamps $4^e$ or other suitable means. As many of these suction cups $4^c$ are attached to the tube $4^a$ as desired; and any of the holes $4^b$ to which no nipples are attached can be closed by removable screw plugs $4^{bx}$. (Fig. 11).

The tube $4^a$ is mounted on the outer end of a lever $4^f$ which is pivoted on a bearing $4^g$ attached to table $1^d$ (Figs. 2-4) and lever $4^f$ can be swung on its pivot $4^g$ by means of a pitman $4^k$ having one end pivotally connected at $4^h$ with the lever $4^f$ (Fig. 2), and its lower end connected to a lever 4, which is pivoted on a cross shaft $24^a$, in the main frame, or other suitable support. (See Fig. 3). Lever 4 carries a pin which is adapted to be engaged by a cam $4^s$ attached to a disk 24 on a shaft 17 mounted in suitable bearings in the base of the machine (Figs. 3-5) and for each rotation of the shaft 17 the lever 4 is raised and lowered to cause the oscillation of the picker $4^a$ at proper times from the position shown in dotted lines in Fig. 2 to the position shown in full lines therein; and at each such operation the picker will remove a ballot $13^a$ from the box and lay the same upon the feed table $1^d$. The tube $4^a$ may be connected with any suitable vacuum apparatus.

The vacuum may be produced at the proper time in the picker tube $4^a$ by means of an ordinary pump $17^c$ (Fig. 3) which has a piston connected by a rod $17^b$ to a crank pin $17^a$ on the disk 24 on shaft 17. The shaft $4^k$ may be adjusted in length by a turn buckle $4^m$ to regulate the throw of the picker $4^a$ so that it will have just the proper movement to cause the suction picker to properly separate and feed the ballots. The cam $4^s$ causes the upward throw of the picker and the downward movement thereof is caused by a spring $4^p$ connected to the lever.

To regulate the suction pressure in the picker it may be provided at one end (Fig. 11) with a relief valve $4^u$ mounted in a casing 4$^t$ attached to the end of pipe 4$^a$; this valve opens inwardly and is held to its seat, at any desired pressure, by means of a spring 4$^w$ interposed between a nut 4$^v$ on the outer end of the valve stem and the casing 4$^t$. The vacuum pump tends to suck the valve inward and if the vacuum pressure becomes too great such valve will open sufficiently to relieve the pressure, which may thus be regulated to a nicety regardless of the variation in the suction produced by the reciprocatory movement of the piston in the pump 17$^c$.

Attached to the side plates 5 in advance of the stops 5$^s$ are stripper blades 5$^t$ (Figs. 2–4), and if a second ballot should (either through electrical attraction or suction), adhere to the rear of the ballot 13$^a$ being removed from the box by the picker, the stripper plates would detach such second ballot from the ballot engaged by the picker and thus the strippers 5$^t$ prevent two or more ballots being laid at any one time onto the feed table 1$^d$ by the picker. If a second ballot should be moved forward with the ballot engaged by the picker, the strippers 5$^t$ will arrest it and such ballot will rest upon the forward curved ends 5$^{ex}$ of the tracks 5$^e$ and when the picker returns to pick up another ballot it will engage such detached ballot and move it back against the pile of ballots and properly grasp it and lower it upon the feed table at the next forward movement of the picker.

*Means for feeding the ballot to the registering devices.*

From the feed table 1$^d$ the ballot is moved forward into position for operation upon by the detecting and registering mechanisms by suitable means. As shown in Figs. 2 and 4 a slide 3$^a$ is mounted between guides 1$^f$ riveted to table 1$^d$ with a spacer 1$^e$ therebetween (see Figs. 9–10). This feed slide 3$^a$ is recessed in its upper side and through this recess extends a rod 3$^d$ which may be pinned to the slide; and on this rod is slidably mounted a finger 3$^c$ which projects above the slide and the top of the table or plate 1$^d$ and is adapted to engage the rear edge of the ballot after same has been laid on the table by the picker.

The finger 3$^c$ is normally held at the front end of the slide by means of a spring 3$^e$ strung on a rod 3$^d$ between the finger and the rear end of the slot in the slide. This spring permits the finger 3$^c$ to yield slightly, if necessary, in accurately locating the ballot under the detector pins.

The feed slide 3$^a$ is operated at the proper time by suitable means. As shown a link 3$^r$ is pivotally connected to a lug 3$^f$ on the underside of the slide (Figs. 2, 9 and 10) and to the upper end of an actuating lever 3, the lower end of which is pivoted to a lug 3$^x$ on the base plate 1$^b$ (Figs. 3 and 5). The lever 3 is connected near its lower end by a pitman 3$^s$ to a crank 3$^t$ on the shaft 17. The pitman 3$^s$ may be adjustably engaged with the lever 3 to regulate the extent of its movement as by means of holes in the lever, indicated in Fig. 3: and the pitman 3$^s$ may be adjusted in length by means of a turn buckle 3$^u$ (Fig. 3.) By this means the throw imparted to the feed slide 3$^a$ by the lever and crank can be nicely regulated so as to insure that the ballots will be moved accurately from the feed table 1$^d$ into position beneath the detecting pins.

*Means for ejecting registered ballots.*

The feed slide 3$^a$ is also utilized to operate the means for ejecting the ballots from the registering mechanism after the same have been registered. For this purpose a discharge slide 3$^p$ is also mounted in the guides 1$^f$ in advance of the feed slide 3$^a$ and the discharge slide 3$^p$ has pivoted on its front end a lever having a finger 3$^k$ on its upper end, which finger in one position of the lever will project above the feed plate (Fig. 9) to engage a ballot 13$^a$, and in another position of the lever will lie below the top plate (Fig. 10). The lower arm 3$^h$ of this lever is pivotally connected by a link 3$^g$ with the lug 3$^f$ of the slide 3$^a$ (Figs. 9 and 10), and on the forward movement of the slide 3$^a$ the link 3$^g$ causes its finger 3$^k$ to project above the feed table (as in Fig. 9), and then moves the slide 3$^p$ forwardly with the slide 3$^a$. On the rearward movement of the slide 3$^a$ the lever 3$^g$ first pulls the lever 3$^h$ backward to lower the finger 3$^k$ (as in Fig. 10), and then moves the slide 3$^p$ backward with slide 3$^a$.

In this manner a ballot 13$^a$ may be first moved from the position on the feed table shown in full lines in Fig. 2 and at 13$^{ax}$ in Fig. 9 to the position shown in 13$^{ab}$ in Fig. 9, (which position 13$^{ab}$ is assumed to be the position of the ballot when being operated on by the detecting and registering devices). But on the next forward stroke of the slide 3$^a$ the finger 3$^k$ will engage the edge of the ballot lying in position 13$^{ax}$ (Fig. 9) and move the ballot to the position 13$^{ab}$ (Fig. 9) which finger 3$^k$ moves the preceding ballot from position 13$^{ab}$ out from the registering mechanisms; and on the return movement of the slide 3$^a$ the finger 3$^k$ will pass beneath the ballot lying in position 13$^{ax}$ beneath the registering mechanism.

*Registering mechanism.*

As stated, this machine is designed to count ballots such as shown in my Patent No. 1,350,914. A part of one of these ballots is shown in Fig. 18. This ballot 13$^a$ has spaces S for the names of the candidates and the voter who desires to register a vote for any candidate makes a perforation $p$ in the ballot in the space containing the name of the candidate for whom he wants to vote. The spaces are all accurately alined on the ballot and in the actual ballot there would be a number of parallel columns of such spaces and the perforations must be made in the ballot at defined points. Of course every space would not be punched, and in registering the ballot only those spaces where the perforations have been made will be registered in the registering mechanism. Each ballot $13^a$ is also provided with an alining groove or notch $13^b$ in one side which is adapted to engage a guide rib $5^e$ in the bottom of the ballot feed box (Figs. 2 and 4) accurately positioning the ballots in the feed box.

The machine shown is adapted to register ballots having five parallel columns of spaces S (Fig. 6) and 20 spaces in each column (Fig. 1) and for this purpose the registering mechanism is provided with five columns of detector pins $7^a$ as indicated in Fig. 6, and with twenty detector pins $7^a$ in each column, as indicated in Fig. 1; Fig. 6, showing an end elevation, and Fig. 1 a side elevation of the detector and registering mechanisms.

In some instances where a voter changes the ballot by writing in a name in order to vote for a personal candidate whose name does not appear upon the regular ballot, he will make an additional perforation on the ballot indicated at $13^d$, Fig. 18, and where such a special ballot is voted I provide means for detecting this ballot and throwing it out of the mechanism without registering same, as it must be counted separately. For this purpose a special detecting pin $10^a$ is provided (see Fig. 1) and cooperating devices hereinafter referred to.

The detector pins $7^a$ are arranged parallel in a suitable casing in one side of the feed plate $1^d$ and just above the level of said plate, and the casing is supported in such position that ballots $13^a$ may be successively moved from plate $1^d$ into position beneath the detector pins and registering mechanism as indicated in Figs. 1 and 6. As shown the detector pins $7^a$ are guided in suitable openings in bottom bars or plates $2^a$ and in top bars $6^d$, by which they are held in vertical parallel alinement.

Beside each longitudinal row of pins $7^a$ is mounted a rock shaft 9, suitably journalled in bearings in the frame; and each shaft 9 has at one end an arm $9^h$ (Figs. 1 and 8) which is pivotally connected to a bar $9^k$. Bar $9^k$ is connected by a link $9^i$ (see Fig. 8) to the upper end of a lever $9^m$ pivoted on a bracket $9^n$ suitably mounted on the frame $1^b$. This lever $9^m$ is connected at its lower end by a link $9^p$ to a slide $9^r$ carrying a roller $9^s$ which engages a race $9^t$ in a cam $9^u$ loosely mounted on a shaft 18 (Fig. 7) but clutched to the shaft as hereinafter explained, so as to cause the lever $9^m$ to rock the shafts 9 simultaneously at the proper time to cause the detector pins to operate upon the ballot positioned thereneath. The link $9^p$ may be adjustably engaged with the lower end of the lever $9^m$, which is shown in Fig. 7, provided with a plurality of holes $9^o$ with any one of which lever $9^p$ may be engaged. Any other suitable adjusting means may be provided.

On the shaft 9 adjacent each detector pin $7^a$ is a cam member $9^a$ which has a long tooth $9^c$ (Fig. 6) that engages a pin or lug $7^b$ on the related detector pin $7^a$; each cam member $9^a$ is yieldingly connected with its shaft 9 by means of a coiled spring $9^d$ (Figs. 1–6) one end of which may be engaged with a key slot in the shaft 9 carrying the cam member, and the other end of which is connected with a perforation in the cam member. As shown, each cam member $9^a$ may be provided with a series of perforations $9^{af}$ with which the end of the spring $9^d$ may be engaged, so as to impart greater or less tension to the spring. Each cam member has a limited rotary movement on its shaft for a purpose hereinafter explained. To permit this each cam member is provided with an arc-shaped slot $9^{aa}$ which engages a key $9^{ad}$ on its shaft 9; and the spring $9^d$ normally holds the cam member with one end of its slot $9^{aa}$ against the key $9^{ad}$, as indicated in Fig. 6.

Each detector pin $7^a$ is free to move downward by gravity, and is preferably provided with a weight $7^e$ to facilitate its descent, but each pin is normally upheld by the tooth $9^c$ of the related cam member $9^a$ (Fig. 6) engaging the under side of the lugs $7^b$ on the detector pins until the shafts 9 are rocked to the right by the action of the cam $9^u$ and lever $9^m$ as above explained.

When shafts 9 are rocked to the right (Fig. 6) the cams $9^a$ permit the detector pins to lower onto the ballot underlying the same. If any detector pin $7^a$ is arrested by contacting with an imperforate portion of the ballot $13^a$, a shorter tooth $9^b$ on the related cam member will not engage the lug $7^b$ on the detector pin, but will pass under same leaving this detector pin resting on the ballot and out of action, therefore not registering.

If any detector pin $7^a$ finds a perforation $p$ in the ballot it can pass through such perforation in the ballot until it is arrested by striking the top of one of the interlocking pins $14^a$ hereinafter referred to. A detector pin which is arrested by contact with an imperforate portion of the card does not register, but a pin which finds a perforation in the ballot will be further depressed by the tooth $9^b$ of the related cam member engaging the upper side of the lug 7ᵇ on the pin and under the action of the further movement of shaft 9 and pressure of the spring 9ᵈ the detector pin finding a perforation in the ballot will force the related interlocking pin down (if the ballot is correct), as hereinafter explained, and also operate the related register. Each detector pin is shown as provided on its upper end with a pivoted pawl 7ᵈ (see right hand upper end of Fig. 6) which when the detector pin is depressed by the action of the tooth 9ᵇ of its related cam 9ᵃ is adapted to engage the ratchet 8ᵃ of a related register 8, one of which is mounted adjacent the upper end of each detector pin 7ᵃ in such position that the pawl 7ᵈ of such detector pin will engage the ratchet 8ᵃ of its related register, and move it one point when it is operated by the tooth 9ᵇ of the related cam member. This can only occur in case such detector pin finds a perforation in the ballot.

On the rise of the detector pins backward movement of the registers is prevented by pawls 8ᵇ. The pawls 7ᵈ are free to spring back on the return strokes of the detector pins and the pawls 8ᵇ merely prevent the counters turning backward.

I do not herein claim the particular construction of the registers 8 as these are well known and therefore I have not illustrated same in detail. There should be a detector pin for each candidate on the ballot and one registering device 8 provided for each detector pin; and each time a detector pin finds a perforation in the ballot a vote is registered by the proper mechanism for the candidate adjacent whose name the perforation appears.

If the detector pins should become locked and not move down under the pressure of the second arm 9ᵇ of the cam-member 9ᵃ, the shaft 9 will continue to make its full movement, the key 9ᵃᵈ having room in key slot 9ᵃᵃ in the cam-member to move back without engaging the cam-member. As one end of the spring 9ᵇ is affixed to this shaft 9 and the other end is affixed to the cam member, the movement of the shaft will be against the resistance of this spring and in turn the resistance of this spring is against the resistance of the interlocking pin 14ᵃ (hereinafter referred to). In other words the down stroke of the cam-member 9ᵃ is yieldingly pulled by the spring and the motion of shaft 9; and the up stroke of the cam-member 9ᵃ is caused by the key engaging the end of seat 9ᵃᵉ.

All the cam-members 9ᵃ work simultaneously, as do all the detector pins 7ᵃ, therefore all holes (or votes) in the ballot are detected simultaneously by the pins 7ᵃ.

*Interlocking system.*

If a voter should improperly punch the ballot for more than the proper number of candidates in any group, (as for example, aldermen, councilmen, etc., where a plurality of candidates are to be voted for) such action would invalidate his vote for any of the candidates in such group, and it is therefore necessary to prevent the registering of the votes of any of the candidates in such group.

Arranged directly beneath the system of detector pins 7ᵃ above described is a like system of interlocking devices, one for each pin 7ᵃ. These interlocking devices are mounted upon a plate 15. (Figs. 6–12), which is supported and slidably mounted in grooved bars 15ᵃ attached to the framing 1ᵇ (see Fig. 6) so that when desired this plate with the interlocking devices can be slid out to one side of the machine for convenience in " setting up " the interlocking devices in accordance with the nature of the ballot which is to be registered.

The interlocking devices consist of pins 14ᵃ which are connected with the plate 15, and there is one pin 14ᵃ under and in line with each detector pin 7ᵃ. These pins 14ᵃ are free to work up and down and swivel in their bearings, and are normally pressed upward by springs 14ᵈ interposed between arms 14ᵇ on the pins and a plate 15ᶻ suspended from plate 15 by bolts 15ᵒ (Fig. 6).

Attached to each pin 14ᵃ above and below the plate 15 are arms 14ᵇ which are in line with each other and have recesses in their opposed ends in which recesses are secured the ends of the interlocking blades 14ᶜ. (See Figs. 13–14). These blades 14ᶜ pass through longitudinal slots 15ᶜ in the plate 15 (see Figs. 12, 13, 14) and can move freely up and down in such slots and may also move slightly longitudinally in the slots.

Mounted or formed on the plate 15 at opposite sides of the slots 15ᶜ are parallel bars 15ˡ forming guides for rollers 15ᵉ and 15ᶠ (Figs. 12–14), which rollers are placed between the reduced lower ends of the blades 14ᶜ (Fig. 14). The rollers are confined in the guides by top plates 15ᵈ. Each blade 14ᶜ has its lower portion reduced between the rollers 15ᵉ and 15ᶠ, and each blade has a cam surface 14ˣ adapted to engage the adjacent roller.

Between the blades 14ᶜ in each slot 15ᵐ are placed rollers 15ᵉ or 15ᶠ. I prefer to use rollers between the blades, but other suitable forms of intermediate members may be used. The rollers 15ᵉ are of uniform diameter (Figs. 13–14) while the rollers 15ᶠ have their central portions reduced in diameter (Figs. 13–14). The rollers 15ᵉ or 15ᶠ are placed between the reduced portions of adjacent blades 14ᶜ in accordance with the number of candidates to be voted for in the different groups on the regular ballot. Where the rollers 15ᵉ are placed between blades 14ᶜ the pins 14ᵃ cannot be depressed; but where the rollers 15ᶠ are placed the pins 14ᵃ can be depressed.

These rollers 15ᵉ and 15ᶠ are placed between the blades 14ᶜ, (Fig. 14) so that when a blade is forced down between them it will move them either way as shown in the dotted lines. In the sides of the roller race 15ᵐ are slots 15ᵏ in which stops or locks 15ʰ may be inserted as shown in Figs. 12–14. These stops may be inserted between any of the blades 14ᶜ, and wherever inserted they group off a number of blades and make them independent of the rest, since the stops 15ʰ extend across the roller race as shown in Fig. 13.

The groups of blades are made to conform to the groups of candidates for the different offices on the ballot. In setting up the interlocking devices for operation a roller 15ᶠ should be placed beside blade 14ᶜ for each candidate to be voted for in a group, and a solid roller 15ᵉ will be placed beside all the rest of such blades 14ᶜ as are connected with the pins 14ᵃ that correspond with pins 7ᵃ related to the voting spaces on the ballot. Removing one 15ᵉ roller and substituting a roller 15ᶠ will allow one blade in the group to pass. Substituting two 15ᶠ rollers in place of two rollers 15ᵉ will allow two blades to pass.

Referring to Fig. 14, assume that rollers 15ᶠ represent the number of candidates to be voted for; and the pins 14ᵃ represent the number of candidates running for the office, there being eight candidates running for the office, but only two can be elected. Since all the pins 7ᵃ work simultaneously if there should be more holes punched in the ballot than two, when the pines 7ᵃ were lowered all the blades 14ᶜ (Fig. 14) would lock between the locks 15ʰ and the rollers 15ᵉ and 15ᶠ, and would thus prevent pins 7ᵃ making their full down stroke to the counters, and therefore no votes would be registered for any in this group.

Transfer arms 14ⁿ (Figs. 12 and 13) may be affixed to the top of any arms 14ᵇ so that a group of blades 14ᶜ may be made up of blades in two or more rows intermediate their ends; the arms are detachable. The transfer arms 14ᵐ are permanently affixed at the ends of the rows of blades 14ᶜ and transfer the motion from one row to the succeeding one and may be adjusted to take up wear by screws 14ʳ. All the blades can be tied together by these transfer arms 14ᵐ to make one large group; or may be segregated into smaller groups by inserting stops 15ʰ at the proper points.

The interlocking system eliminates the necessity for hand inspection of the ballots before placing them in the machine. The interchangeable members between the interlocking blades, which may move freely with the blades and adjust the space through which the blades can pass, are most important. By putting in or removing such members and properly placing the stops 15ʰ I can group the locking pins to control the operation of any group of detector pins desired, and no measuring or fitting is required in "setting up" the groups in the interlocking system. The blades and the large and small rollers are ground accurately; and the setting up of the machine is simply and accurately accomplished by changing rollers and inserting stops.

The blades 14ᶜ can move in and out in the recesses in the arms 14ᵇ, their distance from their pins 14ᵃ varying according to their movements along the slots 15ᶜ. The recesses keep the blades upright while they move between the rollers, so that they do not tip, which might cause mis-counting.

After the bevels 14ˣ of the blades pass down between the rollers the upper straight portions of the blades will maintain them in proper relative positions laterally. If one blade lowers a little more than another it will make no difference.

The interlocking permanent transfer arms 14ᵐ' placed at the ends of the rows (Fig. 12) will transfer motion from one row of interlocking pins to another. This enables me to make use of two or more rows of pins 14ᵃ for one large group of candidates, which is frequently necessary when a large number of candidates are to be voted for in a body. The arms 14ᵐ are permanently set up against the outside blades 14ᶜ in the rows so that any motion in one row is transferred to the other.

It is sometimes desirable to be able to set up the interlocking system so that the motion can be transferred from pins in one row to pins in an adjacent row intermediate the ends of the rows. For this purpose small lugs 14ˢ may be formed on the backs on the arms 14ᵇ (see Fig. 13) to which lugs can be attached arms 14ⁿ which extend across to the adjacent row and contact with the arms 14ᵇ of the pins in such row and transfer motion thereto (see Fig. 13). This enables me to use the head pins in all the rows for one group (as in presidential elections) and to use the balance of the rows for other candidates.

The bumper plate 15ʳ under the interlocking pins has two functions; one to loosen any interlocking pins which may stick, the other to prevent any pin going down ahead of the others from getting stuck: the plate goes down with the detector pins and there is about 1/64th of an inch space between the plate and the bottom of the interlocking pins, which prevents one pin dropping too far ahead of another.

The entire interlocking system slides from under the machine so that same can be gotten at for "setting up" before election, which is important, as the system could not be readily set up under the machine. The interlocking device may be adjusted to conform to the different ballots in the different wards in cases where the ballots of different wards vary.

It will be seen that the detector pins detect the ballot before touching the interlocking system. The detecting and interlocking are separate and distinct operations. Very little weight or pressure is required for detecting and any desired force can be applied to the interlocking mechanisms.

Suspended from the plate 15 are rods 15$^p$ on which is hung the buffer plate 15$^r$ that lies below the lower ends of the interlocking pins 14$^a$ and is supported by springs 15$^{px}$, (Figs. 1 and 6). This buffer plate is connected by a link 15$^t$ to one end of a lever 15$^u$ pivoted at 15$^w$, Fig. 7, on a bracket 15$^x$, and the other end of this lever carries a roller 15$^v$ engaging a cam 15$^y$ on the shaft 18. This bumper plate is lowered out of the way of the pins 14$^a$ at the proper time, and is then raised so as to loosen and elevate any of the interlocking plates 14$^c$ which might have stuck between the rollers.

Individual special ballot throw-out.

In some cases the voter instead of voting for a candidate whose name appears on the ballot may wish to vote for a special candidate. In this case he writes the name in the proper blank space in the ballot and makes a special perforation in the ballot at 13$^d$, Fig. 18. When such a special ballot is presented underneath the detecting pins, it is detected and shunted therefrom after registration by the following devices.

Mounted in the casing beside the detector pins 7$^a$ is a detector pin 10$^a$, Fig. 1. This detector pin is so located that when a special ballot 13$^a$ having a hole 13$^d$ is properly fed into the machine the pin 10$^a$ will find the hole 13$^d$ and when it finds such a hole 13$^d$ it operates mechanism for discharging such ballot into a separate receiver, so that the votes for special candidates can afterwards be counted by hand.

The pin 10$^a$ has a pin 11$^e$ which is adapted to be engaged by a cam member 11 mounted on the adjacent shaft 9, which cam member is constructed and operated similarly to the cam members 9$^a$ for actuating the pins 7$^a$ above described, and if the hole 13$^d$ be punched in the ballot, pin 10$^a$ (Fig. 17) will pass through the ballot as indicated in dotted lines in Fig. 17, and engage a trigger 12$^a$ and force the latter down. The trigger 12$^a$, Figs. 1 and 17, is pivoted on a lug 12$^x$ and has an arm 12$^y$ which is connected by a link 12$^b$ to an arm 12$^c$ of a lever pivoted on a bracket 12$^f$ on the frame; an arm 12$^e$ of this lever is pivotally connected to one end of a link 12$^h$, the other end of which is pivotally connected at 12$^z$ to the discharge chute 12.

When pin 10$^a$ engages the trigger 12$^a$ it is depressed (in the same manner that the pins 7$^a$ are depressed when they find holes in the ballot) and this rocks trigger 12$^a$ and causes the lever arm 12$^e$ and link 12$^h$ to raise the discharge chute 12 up from its normal position (shown in full lines in Figs. 1 and 17) to the position indicated in dotted lines in Fig. 17, and hold it in this position until the special ballot is discharged; such ballot being ejected into a receiver beneath the chute 12 instead of into the chute.

To the pivot 12$^d$ is attached a trip-pin 12$^g$ which when the discharge chute 12 is raised (as shown in dotted lines in Fig. 17), assumes the position shown in dotted lines in Fig. 17, in which position it projects into the path of the ballot ejector 3$^k$ and will be struck by this ejector and forced back from the position shown in dotted lines (Fig. 17) to the position shown in full lines (Fig. 17) thus returning parts 12$^a$, 12$^h$, 12$^e$ and the feed chute 12 to the positions shown in full lines in Fig. 17.

The parts 12$^e$, 12$^h$ virtually form a toggle and when thrown into the position shown in dotted lines in Fig. 17, their pivot connection passes the center of the toggle and thus holds the chute raised until the toggle is broken by the finger 12$^g$ being struck by the finger 3$^k$, which knocks the toggle joint back past the center, and the discharge chute then falls by gravity allowing the succeeding ballots to pass thereinto until another special ballot is detected.

Means for positioning the ballots laterally.

As the ballots are advanced by the feed slide 3$^a$ underneath the registering mechanism they are positioned laterally by means of devices shown in Figs. 1, 15 and 16.

Mounted at one side of the path of the ballot upon the plate 2$^a$ is a short lever 16$^a$ pivoted on a pin 16$^c$, and provided with a spring 16$^f$ adapted to swing the lever inwardly. The tension of this spring can be varied by engaging it with different holes 16$^e$ in the lever 16$^a$.

Depending from this lever is a cam shoe 16$^b$ which depends through an opening 2$^d$ in the plate 2, Figs. 15 and 16, and lies in the path of the ballot so that the edge of the ballot which passes along the dotted line $x$ in Fig. 15 would engage the shoe 16$^b$ and swing the lever 16$^a$ outward against the tension of the spring 16$^f$. Lever 16$^a$ carries a contact pin 16$^k$ which is adapted, when the lever is in normal position and not engaged by the ballot, to make electrical connection with an opposed contact 16$^l$ mounted in a support 16$^q$ on the plate 2$^a$, see Figs. 15 and 16.

The contacts 16$^k$, 16$^l$, make or break an electrical circuit whereby the machine is enabled to perform one cycle of operation whenever a ballot is placed beneath the registering mechanims, as hereinafter explained.

The shoe 16$^b$ depends below the surface 1$^d$ on which the ballot lies so that there will be no danger of the edge of the ballot passing under the shoe; and this shoe 16$^b$ presses the ballot laterally against the opposite side of the passage-way (or right hand end of Fig. 6) and insures that the holes in the ballot will be in position to accurately register with the detector pins 7$^a$. It is necessary to prevent the operation of the detector pins when no ballot is fed under same for counting, and this may be done as follows:—

*Electrical control device.*

All the detectors receive their motion from cam 9$^u$ on shaft 18; cam 9$^u$ is loose on shaft 18 but may be locked thereto by a clutch 16$^v$; this is a one jaw clutch, and when disengaged shaft 18 must make a complete revolution before it can re-engage; this prevents cam 9$^u$ from getting out of time. Clutch 16$^v$ is splined on shaft 18, and may slide back and forth on said shaft, and it is operated to disengage cam 9$^u$ by a magnet 16$^r$ (Figs. 3 and 7).

A clutch lever 16$^t$ is pivoted on a support 16$^y$ and has one end engaged with the clutch 16$^v$ and the other is engaged with the magnet core 16$^s$, so that when magnet 16$^r$ is engaged the core will operate lever 16$^t$ and disengage clutch 16$^v$ from cam 9$^u$ and the cam will stop and the detector pins 7$^a$ will not be operated if no ballot is presented under the detector pins.

I preferably control the electric current by the presence of a ballot under the detector pins, so that the latter will always be operated when a ballot is present; therefore I control the current by the shoe 16$^b$ (Figs. 15 and 16). As described, said pressure shoe lies in the way of the edge of the ballot so that when the ballot is moved forward under the detector pins it engages and forces the shoe 16$^b$ back, thus breaking the circuit: and this permits the cam 9$^u$ to continue to operate: but if no ballot is presented the shoe remains in normal position and the circuit remains closed and therefore the magnet will operate and stop cam 9$^u$.

It is also necessary to so time the passage and duration of the electric current that the cam 9$^u$ will not be stopped in the intervals between successive ballots. The normal space between two successive ballots is indicated in Fig. 9. When the machine is operating normally there is space enough between two successive ballots to allow the shoe 16$^b$ to spring in for an instant in the space between two successive ballots and make the contacts to close the circuit controlling the clutch. I therefore employ an electrical timer 16$^p$. As shown this timer may consist of a fiber or non-conducting body 16$^p$ fixed on the shaft 18, and having on its surface a metal contact plate 16$^{ae}$; brushes 16$^o$ and 16$^{ox}$ are mounted beside body 16$^p$ in position to engage plate 16$^{ae}$ as the body rotates. An electric conductor 16$^n$ is connected to brush 16$^o$, and with the contact 16$^k$ on shoe 16$^b$, and another conductor 16$^m$ is connected with brush 16$^{ox}$ and with magnet 16$^r$; and from these to a lamp socket (not shown); and a conductor 16$^q$ connects the pressure shoe (Fig. 15) to the lamp socket (not shown).

When both brushes 16$^o$ and 16$^{ox}$ contact with the plate 16$^{ae}$ on timer 16$^p$ the circuit is closed and if no ballot is present under the detectors clutch 16$^b$ disengages cam 9$^u$. The circuit is broken by timer 16$^p$ in the interval of time between one ballot leaving and the next reaching the shoe,—in other words it makes the contact at the time the shoe is engaged with the edge of one ballot and breaks it just before such ballot clears the shoe. In this way the operation of the detector pins is under the control of the ballots and the timer controls the time of operation of the clutch.

The machine frame may be provided with rollers 1$^x$ at the discharge end, so it can be conveniently moved, and it may be operated by any suitable means. As shown the mechanisms are driven by a motor 20$^b$ (Figs. 3 and 7) having a shaft 20 carrying a pinion 20$^a$ meshing with an intermediate gear 19$^b$, on an intermediate shaft 19, carrying a pinion 19$^a$ meshing with a gear which is loose on a shaft 18, but is driven therewith by means of a friction clutch 18$^c$ which is adapted to yield in case anything goes wrong with the machine and the parts stick.

As shown in Figs. 1 and 6, 6$^a$ is a glass top for reading the counters 8$^b$.

Cam shaft 17 may be extended out at one side and provided with a hand wheel 17 so that it can be operated by hand power if necessary.

*Operation.*

After the poles close, the voted ballots are placed in the ballot feed box (Figs. 2-4), between follower 5$^b$ and the ballot stops 5$^s$. The ballot alinement tongue 5$^c$ which engages the notches 13$^b$ in the ballots prevents their being improperly placed in the box. The follower forces the ballots against the stop 5$^s$ and holds them against same so the vacuum picker 4$^a$ may remove one ballot at a time.

When the machine is started the picker 4$^a$ moves from the position shown in full lines Fig. 2 in and up against the innermost ballot in the box as shown in dotted lines and the pressure flattens out the rubber vacuum cups 4ᶜ against the ballots; and the vacuum is produced by the pump and the picker grasps the top ballot and holds it while the picker makes its down stroke. Air is then forced into the vacuum chamber of the picker 4ᵃ and loosens the ballot from the vacuum cups 4ᶜ. The feed head finger 3ᶜ is advanced over the end of the ballot before the vacuum is broken, and prevents the ballot from flying up. The ballot now rests on bed plate 1ᵈ.

The feed slide and finger 3ᶜ then move the ballot along on the table 1ᵈ into the space between the plates 1ᵈ and 2ᵃ (Figs. 1–6–16) which space is just large enough to admit the ballot, and as the ballot is brought into the correct position longitudinally beneath the set of detector pins, it is also positioned correctly laterally by the action of the cam shoe 16ᵇ, as above described, so that it is placed in exact position for registering any perforations in the ballot with the related detector pins 7ᵃ.

As the ballot is thus moved beneath the detector pins its edge engaging the cam shoe 16ᵇ moves the latter and breaks the circuit between the points 16ᵏ and 16ˡ (Fig. 15) and therefore the cam 9ᵘ, which controls the operation of the detector pins, remains in engagement with the shaft; and consequently at the proper time lever 9ᵐ is operated to lower the detector pins 7ᵃ and 10ᵃ simultaneously onto the ballot. Each detector pin that finds a hole in the ballot will pass through the ballot and rest upon the related interlocking pin 14ᵃ (Figs. 1–6); and such dropped detector pins will be further depressed by the operation of the tooth 9ᵇ on the cam member 9ᵃ, as above described as to forcibly depress the related interlocking pins; (provided there has been no improper perforation of the ballot); as above described.

The detector pins are then raised by the continued movement of the cam 9ᵘ through one cycle or rotation and after the detector pins have cleared the ballot which has just been registered, it is ejected from beneath the detector pins by the action of the ejector 3ᵏ, as above described, and simultaneously with the feeding forward into registering position of the next successive ballot by the feed slide 3ᵈ; which during the time the preceding ballot was being registered is retracted into position to engage the succeeding ballot; and during which time the picker 4ᵃ is operated to take another ballot from the box and lay it upon the table 1ᵈ.

Each detector pin 7ᵃ which has found a perforation in a ballot and is depressed by cam member 9ᵃ as described registers a vote on the related registering device 8 for the candidate indicated.

In the mechanisms all the detector pins which find holes in the ballot are simultaneously operated, and the votes for each candidate properly punched on the ballots are simultaneously but separately registered.

During the registering operation the ejector 3ᵏ is retracted by the feed slide and passes beneath the ballot in position on the registering mechanism.

If the ballot which is being registered should be a special ballot (having the name of a personal candidate inserted by the voter, and therefore having a perforation 13ᵈ in its margin) the detector pin 10ᵃ would be depressed and cause the chute 12 to be raised into the position shown in the dotted lines in Fig. 17, so that such special ballot instead of being ejected into the chute 12 would be discharged beneath the chute into a separate receptacle as above explained. The regular ballots however are discharged into the chute.

If the voter had improperly punched the ballot for more than the proper number of candidates in any group, such action would invalidate his vote for any of the candidates in such group. In the event that such a ballot is presented beneath the detecting devices the detector pins 7ᵃ will find all the holes in the ballot for such group, and an improper number of detector pins will be lowered onto the interlocking pins 14ᵃ of this group. But when the mechanisms start to depress the detector pins in this group the detector pins cannot be operated because the interlocking pins of the group will prevent it, as the blades 14ᶜ for each group are so arranged that only the maximum number of candidates can be legally voted for at one time by any one voter, and if the voter attempts to vote for more than the proper number of candidates then the interlocking device prevents the operation.

Minor sub-operations and functions of different parts have been set forth above.

From the foregoing it will be seen that I have provided a complete machine whereby particularly prepared ballots can be accurately and repeatedly counted and that such machine performs various novel functions and accomplishes the desired ends and is successful and practical.

I do not consider the invention in its broader aspects restricted to the particular mechanisms shown, which could be modified or replaced by other mechanisms or elements adapted to perform the like functions in substantially the same way. I therefore do not consider the invention restricted to the particular mechanisms, combinations and sub-combinations of parts, and constructions thereof, herein shown and described: and in the claims following I have defined the invention both in its broader and more general aspects, and also set forth the more specific novel combinations of parts and novel features of construction for which protection is desired.

In the claims the terms "vertical", "upper", "lower", "depressing", etc., indicating relative locations, positions and movements of the parts are used in an explanatory and not a limiting sense, and therefore the claims are not intended to be limited by such terms.

What I claim is:—

1. In a machine for the purpose specified; a plurality of detectors; means for lowering the detectors upon a perforated card to detect same; and means for forcibly depressing such of the detectors as find holes in the card, means for feeding a plurality of cards beneath the detector pins prior to the detecting operation; and means for ejecting the card after the detecting operation.

2. In a machine for the purpose specified; a plurality of detectors; means for lowering the detectors upon a perforated card to detect same; and means for forcibly depressing such detectors as find holes in the card with interlocking mechanism comprising a series of members corresponding in number and location with the detectors, any detector finding a hole in the card engaging the related interlocking member and preventing effective operation of the detector if the ballot is improperly punched.

3. In a machine for counting punched ballots, a series of detector pins, adapted to find the holes punched in the ballot; means for individually forcibly depressing all of the pins that find holes in the ballot; and individual registering mechanism adapted to be operated by the related detector pins when forcibly depressed.

4. In a machine as set forth in claim 3; interlocking mechanism whereby the forcible operation of the detector pins is prevented if the ballot is improperly punched.

5. In a machine as set forth in claim 3; interlocking mechanism having a series of members corresponding in number with the number of the detector pins, any detector pins finding holes in the ballot engaging the related interlocking devices and preventing effective operation of the detector pins if the ballot is improperly punched.

6. In a machine for counting perforated ballots and the like; a series of detectors corresponding to the divisions of the ballot and adapted to find holes punched in the ballot; automatic means for positioning a ballot beneath the detectors; automatic means for lowering the series of detectors upon the ballot permitting the detectors which find holes in the ballot to partly drop through the holes therein; automatic means whereby such of the detectors as find holes in the ballot may be forcibly depressed; and a registering device for each detector adapted to be operated thereby when such detector is forcibly depressed.

7. In a machine as set forth in claim 6; a series of interlocking devices one for each detector, the related interlocking device being engaged by each detector which finds a hole in the ballot; and means whereby the interlocking devices will prevent the forcible depression of the detectors if the ballot is improperly perforated.

8. In a machine for counting perforated ballots and the like; a series of detector pins corresponding in number and location to the divisions of the ballot and adapted to find holes punched in the ballot; automatic means for positioning a ballot beneath the detectors; means for lowering the detector pins upon the ballot permitting the detector pins which find holes in the ballot to partly drop through such holes by gravity; automatically operable means whereby such of the detector pins as find holes in the ballot may be forcibly but yieldingly depressed; and an individual registering device for each detector pin adapted to be operated by such pin when it is so forcibly depressed.

9. In a machine as set forth in claim 8; a series of interlocking devices one for each detector pin arranged opposite the detector pins, the related interlocking device being engaged by each detector pin which finds a hole in the ballot; said interlocking devices being operated by the forcible depression of the detector pins; the interlocking devices preventing the forcible depression of the detector pins if the ballot is improperly perforated.

10. In a machine as set forth in claim 8; a series of interlocking pins one for each detector pin, arranged opposite the detector pins, the related interlocking pin being engaged by each detector pin which finds a hole in the ballot; and operated by the forcible depression of such detector pin; and means whereby the interlocking pin is locked against movement and will prevent the forcible depression of the detector pin if the ballot is improperly perforated.

11. In a machine for the purpose specified, a plurality of detectors; means for lowering the detectors upon a perforated card to detect same; yielding means for forcibly depressing all the detectors that find holes in the card; means for positioning a card beneath the detectors; a yieldable member displaced by the card when positioned; means for operating the detectors; electrical devices for controlling the operation of said means; and devices operated by said yieldable member for making or breaking the electrical circuit through the controlling devices.

12. In a machine for the purpose specified, a plurality of detectors; means for lowering the detectors upon a perforated card to detect same; yielding means for forcibly depressing all the detectors that find holes in the card; means for feeding a card endwise beneath the detectors, a movable spring pressed shoe for positioning the card sidewise, means for operating the detectors; electrical devices for controlling the operation of said means; and devices operated by said shoe for making or breaking the electrical circuit through the controlling devices.

13. In a machine as set forth in claim 3; means for positioning a card beneath the detector pins, a yieldable member displaced by the card when positioned; means for operating the detector pins; electrical devices for controlling the operation of said means; and devices operated by said yieldable member for making or breaking the electrical circuit through the controlling devices.

14. In a machine as set forth in claim 3; means for positioning a card endwise beneath the detector pins; a movable spring pressed shoe for positioning the card sidewise, means for operating the detector pins; electrical devices for controlling the operation of said means; and devices operated by said shoe for making or breaking the electrical circuit through the controlling devices.

15. In a machine as set forth in claim 6; a yieldable member displaced by the card when positioned; electrical devices for controlling the operation of said means; and devices operated by said yieldable member for making or breaking the electrical circuit through the controlling devices.

16. In a machine as set forth in claim 6; a movable spring pressed shoe for positioning the card sidewise; electrical devices for controlling the operation of said means; and devices operated by said shoe for making or breaking the electrical circuit through the controlling devices.

17. In a machine as set forth in claim 8; a yieldable member displaced by the card when positioned; electrical devices for controlling the operation of said means; and devices operated by said yieldable member for making or breaking the electrical circuit through the controlling devices.

18. In a machine as set forth in claim 8; a movable spring pressed shoe for positioning the card sidewise; electrical devices for controlling the operation of said means; and devices operated by said shoe for making or breaking the electrical circuit through the controlling devices.

19. In a machine for the purpose specified; a movable detector; a yielding member mounted beside the detector and normally holding it in raised position; means for rocking the member to permit the detector to descend; and means for causing said member to forcibly depress the detector if it finds a hole in the card.

20. In a ballot counting machine, a movable detector; a cam member mounted beside the detector and normally holding it in raised position; means for rocking the cam member to permit the detector to descend; and means for causing said cam member to forcibly depress the detector if it finds a hole in the ballot, said cam member yielding if the ballot is improperly perforated.

21. In a ballot counting machine; a movable detector pin; a rocking cam member yieldingly mounted beside the pin and normally holding the pin in raised position and having a tooth to depress the pin; means for rocking the cam member to permit the detector pin to descend; means for moving said cam member to forcibly depress the pin if it finds a hole in the ballot; said cam member yielding if the ballot is improperly perforated.

22. In mechanism of the character specified; a plurality of detectors; a rock shaft beside the detectors; an individual cam member for each detector mounted on said shaft, said cam member normally upholding the detector and adapted to also forcibly depress the detector when the shaft is rocked; and means for rocking said shaft to cause the cam to first lower the detector onto a card and then forcibly depress any detector which finds a hole in the card.

23. In a ballot counting mechanism; a plurality of detector pins; a rock shaft beside the detector pins; a cam member for each detector pin yieldingly mounted on said shaft; said cam member normally upholding the related detector pin and having a tooth adapted to engage and forcibly depress such pin; and means for rocking said shaft to cause the cam members to first lower the detector pins onto the ballot and then to forcibly depress any pins which find holes in the ballot.

24. In interlocking mechanism of the character specified; a series of parallel pins provided with arms, cam blades attached to such pins, a guide for the cam blades, changeable members mounted between the cam blades; and means for dividing the cam blades into groups.

25. In mechanism as set forth in claim 24, the changeable members comprising cylindric rollers and spool-shaped rollers as and for the purpose specified.

26. An interlocking mechanism of the character specified; comprising a series of parallel interlocking pins provided with arms, cam blades attached to such pins, a guide slot for the series of cam blades, changeable members mounted in the guide slot between the cam blades; and adjustable stops for separating the blades into groups and for limiting the spreading movement of the blades in such groups.

27. In mechanism as set forth in claim 26, changeable members comprising cylindric

by the feeder adapted to eject the card from beneath the detectors when the feeder advances a new card thereto.

43. In a machine as set forth in claim 3; a reciprocating feeder adapted to move the card into position beneath the detectors; and a reciprocating ejector operated by the feed slide adapted to eject the preceding card from beneath the detectors when the feeder advances a new card thereto.

44. In a machine of the character specified; an interlocking mechanism comprising a series of parallel laterally and longitudinally movable members; changeable members interposed between the adjacent parallel members; means for limiting the extent of separation of said members, and a follower plate adapted to prevent excessive movement of one cam member relatively to another, and to return the same to normal position after operation.

45. Interlocking mechanism of the character specified, comprising a plurality of longitudinally movable cam blades a guide for keeping said blades parallel, interchangeable members mounted in the guide between the blades, adjustable stops for dividing the blades into groups and limiting the extent of separation of the blades in such groups, and a follower plate adapted to prevent excessive movement of one cam blade relatively to another, and to return the same to normal position after operation.

46. In interlocking mechanism of the character specified; a series of parallel cam blades, a guide for said blades; adjustable stops for separating the blades into groups; changeable intermediate members between the adjacent blades adapted to be engaged by the cam blades and cause them to separate when they are depressed, and a follower plate adapted to prevent excessive movement of one cam plate relatively to another, and to return the same to normal position after operation.

47. In a machine for the purpose specified; means for detecting holes in cards, and interlocking means whereby effective operation of the detector pins is prevented if the card is improperly punched, the interlocking mechanism being bodily movable from operative position into position for convenient setting up of the interlocking devices.

48. In a machine for the purpose specified; a plurality of detecting devices for detecting holes in a card; means for operating such of the detecting devices as find holes in the card; and a plurality of interlocking devices corresponding to the detecting devices and adapted to prevent effective operation of the detector devices if the card is improperly punched, the interlocking mechanism being bodily movable from operative position into position for convenient setting up of the interlocking devices.

49. In a ballot counting machine; means for detecting holes in cards, registering means adapted to be operated by such of the detecting means as find holes in the card, and interlocking means whereby effective operation of the detector pins is prevented if the ballot is improperly punched, the interlocking mechanism being bodily movable from operative position into position for convenient setting up of the interlocking devices.

50. In a machine of the character specified; interlocking mechanism comprising a series of parallel movable members; and changeable members interposed between the adjacent parallel members to cause the separation of said members, the interlocking mechanism being bodily movable from operative position into position for convenient setting up of the interlocking devices.

51. In a machine of the character specified; an interlocking mechanism comprising a series of parallel laterally and longitudinally movable members; changeable members interposed between the adjacent parallel members; and means for limiting the extent of separation of said members, the interlocking mechanism being bodily movable from operative position into position for convenient setting up of the interlocking devices.

52. Interlocking mechanism of the character specified, comprising a plurality of longitudinally movable cam blades, a guide for keeping said blades parallel, interchangeable members mounted in the guide between the blades, adjustable stops for dividing the blades into groups and limiting the extent of separation of the blades in such groups, the interlocking mechanism being bodily movable from operative position into position for convenient setting up of the interlocking devices.

53. In a ballot counting machine; means for detecting holes in cards, registering means adapted to be operated by such of the detecting means as find holes in the card, and interlocking means whereby effective operation of the detector pins is prevented if the ballot is improperly punched, the interlocking means being bodily movable from beneath the detecting means into position for convenient setting up of such interlocking means.

54. In a machine for the purpose specified; a plurality of detecting devices for detecting holes in a card; means for actuating such of the detecting means as find perforations in the card; registering mechanisms adapted to be operated by such of the detecting means as find perforations in the card; and a plurality of interlocking devices corresponding to the detecting devices and adapted to prevent effective operation of the detector devices if the card is improperly punched, the interlocking devices being bodily movable from beneath the detecting means into position for convenient setting up of such interlocking devices.

55. An interlocking mechanism of the character specified, comprising a series of parallel interlocking pins to work longitudinally and swivel in bearings, such pins provided with arms, and cam blades to move laterally and swivel in grooves in said arms.

56. In a machine for counting the perforated votes on ballots; automatic operative means for segregating the ballots with written in names (scratched ballots) for separate counting of the written in names.

57. In a machine for counting punched ballots, with means for detecting and counting all the proper perforations in the ballots with automatic operative means for segregating the ballots with the written in names for separate counting.

58. In a machine for counting and registering the properly perforated votes in ballots, means for detecting all the perforations in the ballots; means for preventing the registering of the irregular punched groups; automatic operative means for segregating the ballots which have the names of the candidates written in for separate counting.

59. In a machine for counting perforated ballots; a series of detectors corresponding to the divisions of the ballot and adapted to find holes punched in the ballot; means for automatically positioning the ballot beneath the detectors; means for lowering the series of detectors upon the ballot permitting the detectors which find holes in the ballot to partly drop through the holes therein; means whereby all such detectors that find holes in the ballot are forcibly depressed; registering devices for each detector adapted to be operated thereby when such detectors are forcibly depressed, and automatic operative means for segregating the ballots requiring separate counting.

60. In a ballot counting machine; means for detecting holes in cards, registering means adapted to be operated by such of the detecting means as find holes in the card, and interlocking means whereby effective operation of the detector pins is prevented if the ballot is improperly punched, the interlocking means being bodily movable from beneath the detecting means into position for convenient setting up of such interlocking means.

61. In a machine for the purpose specified; a plurality of detecting devices for detecting holes in a card; means for actuating such of the detecting means as find perforations in the card; registering mechanisms adapted to be operated by such of the detecting means as find perforations in the card; and a plurality of interlocking devices corresponding to the detecting devices and adapted to prevent effective operation of the detector devices if the card is improperly punched, the interlocking devices being bodily movable from beneath the detecting means into position for convenient setting up of such interlocking devices.

In testimony that I claim the foregoing as my own, I affix my signature.

JOHN S. BAKER.